(12) United States Patent
Berger et al.

(10) Patent No.: US 8,313,298 B2
(45) Date of Patent: Nov. 20, 2012

(54) DRIVE TRAIN BETWEEN A ROTOR AND GEAR UNIT OF A WIND POWER PLANT

(75) Inventors: Günter Berger, Castrop-Rauxel (DE); Gerhard Bauer, Witten (DE)

(73) Assignee: Bosch Rexroth AG (DE)

( * ) Notice: Subject to any disclaimer, the term of this patent is extended or adjusted under 35 U.S.C. 154(b) by 1168 days.

(21) Appl. No.: 12/160,333

(22) PCT Filed: Jan. 26, 2007

(86) PCT No.: PCT/EP2007/050771
§ 371 (c)(1),
(2), (4) Date: Jul. 9, 2008

(87) PCT Pub. No.: WO2007/085644
PCT Pub. Date: Aug. 2, 2007

(65) Prior Publication Data
US 2010/0074753 A1    Mar. 25, 2010

(30) Foreign Application Priority Data

Jan. 28, 2006   (DE) .......................... 10 2006 004 096

(51) Int. Cl.
| | | |
|---|---|---|
| A47C 7/74 | (2006.01) | |
| A47C 21/04 | (2006.01) | |
| B63H 1/00 | (2006.01) | |
| B63H 3/00 | (2006.01) | |
| B63H 5/00 | (2006.01) | |
| B63H 7/00 | (2006.01) | |
| B63H 13/00 | (2006.01) | |
| B63H 15/00 | (2006.01) | |
| B64C 11/00 | (2006.01) | |
| B64C 27/00 | (2006.01) | |
| F01D 25/00 | (2006.01) | |
| F03B 3/12 | (2006.01) | |

(52) U.S. Cl. ............ 416/170 R; 290/44; 290/55; 310/83
(58) Field of Classification Search .............. 416/170 R; 290/44, 55; 310/83
See application file for complete search history.

(56) References Cited

U.S. PATENT DOCUMENTS 6,420,808 B1 * 7/2002 Hosle .............................. 310/83
(Continued)

FOREIGN PATENT DOCUMENTS

DE         102 42 707         4/2004
(Continued)

OTHER PUBLICATIONS

International Search Report dated Jan. 26, 2007, Application No. PCT/EP/2007/050771.

*Primary Examiner* — Toan Le
(74) *Attorney, Agent, or Firm* — Jack Schwartz & Associates, PLLC

(57) ABSTRACT

A drive train between a rotor and a transmission having a torque support for a wind turbine generator system, including a rotor shaft extending from the rotor and supported in this area by a first rotor shaft bearing and extending to the transmission for converting the rotor speed into a desired generator speed, wherein the rotor shaft is supported by a second rotor shaft bearing formed in the manner of a moment bearing which is arranged on the input side within the transmission in order to receive the partial rotor forces, moments and weight forces and to directly pass them on to the torque support.

12 Claims, 3 Drawing Sheets

U.S. PATENT DOCUMENTS

| | | | |
|---|---|---|---|
| 6,911,741 B2 * | 6/2005 | Pettersen et al. | 290/44 |
| 7,935,020 B2 * | 5/2011 | Jansen et al. | 475/338 |
| 2004/0162181 A1 * | 8/2004 | LaBath | 475/338 |
| 2006/0070435 A1 * | 4/2006 | LeMieux et al. | 73/168 |
| 2006/0104815 A1 | 5/2006 | Siegfriedsen | |

FOREIGN PATENT DOCUMENTS

| | | |
|---|---|---|
| EP | 1 184 567 | 3/2002 |
| EP | 1 251 268 | 10/2002 |
| EP | 1 457 673 | 9/2004 |
| WO | WO/96/11338 | 4/1996 |
| WO | WO/01/94779 | 12/2001 |

* cited by examiner

DRIVE TRAIN BETWEEN A ROTOR AND GEAR UNIT OF A WIND POWER PLANT

FIELD OF THE INVENTION

The present invention relates to a drive train between a rotor and a transmission of a wind turbine generator system, comprising a rotor shaft extending from the rotor and supported in this area by a first rotor shaft bearing and extending to the transmission for converting the rotor speed to a desired generator speed.

BACKGROUND OF THE INVENTION

In the technical field of wind turbine generator systems, the drive train between the rotor and the mostly downstream transmission can be designed in various ways. One possibility is to directly flange the rotor to the transmission, so that an interposed rotor shaft is omitted. In the concept of interest here the torque generated by the rotor is transmitted to the transmission of the wind turbine generator system via a distance-covering rotor shaft. In more powerful wind turbine generator systems, rotor shafts are needed, for example, to distribute evenly the weight and wind forces generated in the area of the top of the tower of a wind turbine generator system.

From DE 102 42 707 B3, a generic drive train is known. It is essentially comprised of an input rotor for transforming the wind energy to a torque, which is flanged to a rotor shaft on one side of the top of the tower of the wind turbine generator system. On the opposite side of the top of the tower, the rotor shaft feeds the rotary motion generated by the rotor into a transmission with a downstream generator. By spacing the rotor on the one hand and the transmission together with the generator on the other hand via the rotor shaft, an even distribution of the weight and reactive forces is achieved in the area of the top of the tower. This spacing requires a suitable support for the rotor shaft with respect to the machine carrier, which forms the top of the tower and which is pivotable with respect to the tower of the wind turbine generator system, which is in turn fixed with respect to the ground, in order to control the position of the rotor with respect to the wind direction.

The support of the rotor shaft with respect to the top of the tower is formed here in the form of a two-point support and therefore comprises a fixed bearing close to the rotor and a loose bearing close to the transmission. While no loads of the rotor are transmitted into the transmission due to this two-point bearing of the rotor shaft, the necessary bearing positions require additional components.

According to another embodiment it is suggested that the front rotor shaft bearing be formed directly as a moment bearing arranged on the hub of the rotor, the moment bearing being fixed to the machine carrier. With the use of a jointed or flexible intermediate member, again, no external forces are transmitted into the transmission. However, the construction of a moment bearing on the rotor side is very complex, because relatively large bearings are necessary for this purpose.

In the technical approach disclosed in EP 1 457 673 A1, a three-point bearing is suggested allowing the rotor shaft bearing to be omitted on the transmission side by displacing this bearing point directly into the transmission. A bearing at the transmission input thus takes over the function of this bearing point. The force flows here via the planet carrier and is passed on via the torque support of the transmission to the carrier structure. Again, a fixed bearing is utilized as the rotor shaft bearing on the rotor side, which is formed here as a spherical roller bearing. In practice, a pivoting motion—if slight—of the rotor shaft about the bearing point of the rotor shaft bearing due to the weight and wind forces must be accepted. With relatively short rotor shafts, in particular, this bending effect can grow to such an extent that the tooth position of the gears on the input side of the transmission comes out of the optimal tooth engagement, which causes progressive wear and a degradation of the efficiency.

Moreover, in this approach of the prior art, a suitable linking element is necessary between the rotor shaft and the corresponding hollow shaft on the input side of the transmission. As a suitable linking element, a clamp ring is used for pressing the distal end of the hollow shaft at the input side of the transmission radially to the inside onto the corresponding end of the inserted rotor shaft. Such a clamp ring has a substantial mass which adds to the overall mass of the drive train. However, particularly in the area of the top of the tower of a wind turbine generator system, the apparatus installed there should have a small overall mass.

It is an object of the present invention to create a drive train of a wind turbine generator system which has a small mass, needs a minimal number of bearing points and still always ensures the optimum tooth engagement within the transmission.

The object is achieved on the basis of a drive train according to the preamble of claim 1 in combination with its characterizing features. The subsequent dependent claims define advantageous embodiments of the invention.

SUMMARY OF THE INVENTION

The invention includes the technical teaching that, apart from a rotor shaft bearing on the side of the rotor, the rotor shaft is supported by a second rotor shaft bearing formed in the manner of a moment bearing, which is arranged on the input side of the transmission in order to receive the partial rotor forces, moments and weight forces and to pass them on directly to the torque support of the transmission.

The advantage of the approach according to the present invention results from displacing the second rotor shaft bearing, which would otherwise be bearing the shaft near the transmission, into the transmission, wherein its specific construction as a moment bearing ensures that essentially only the torque of the rotor shaft is transmitted to the toothing of the transmission and that the other interfering forces and moments largely caused by weight and wind forces are passed on to the torque support. Since in the approach according to the present invention a clamp ring is not required on the input side of the transmission, the mass is accordingly reduced.

Additionally, means for elastically decoupling the downstream transmission element of the transmission may be arranged downstream of the second rotor shaft bearing as seen in the direction of the force flow. Because of its decoupling effect, this means ensures the optimum tooth engagement of the downstream transmission element even with extreme loads on the moment bearing due to rotor forces, moments and weight forces since it thus ensures that only the torque passes into the toothing of the transmission. A suitable means for elastic decoupling is, for example, a double-cardan coupling unit or a flexible elastic membrane which has its center connected to the rotor shaft and its periphery connected to the downstream transmission element of the transmission. A suitable double-cardan coupling unit is preferably a gear on the input side with a dome-shaped outer toothing in the width and elevation dimension which is in mesh with an overlapping toothed sleeve with corresponding inner toothing which is in mesh with an axially-spaced gear on the output side arranged with respect to the gear on the input side, likewise with a dome-shaped external toothing in the width and elevation dimension.

Preferably, the moment bearing on the input side of the transmission is formed in the manner of a mutually angled, tapered roller bearing pair or in the manner of a triple cylinder roller bearing. However, other suitable structural embodiments are also possible.

If, according to the present invention, the bearing on the input side of the transmission is at the same time the rotor shaft bearing on the side of the transmission, the second rotor shaft bearing arranged in the area of the rotor can be formed as a loose bearing, which is simpler in construction and less prone to failure than a fixed bearing, which is normally used here. The loose bearing on the side of the rotor is preferably constructed in the manner of a spherical roller bearing. The spherical roller bearing, as a loose bearing, does not have to receive any axial forces, and is thus less stressed, which increases its useful life. Because the axial forces caused by the rotor due to wind pressure are fed to the moment bearing via the rotor shaft, they pass via the housing of the transmission and its moment support to the tower of the wind turbine generator system. Between the moment support and the tower of the wind turbine generator system, advantageously, an elastic suspension can be arranged. In the approach according to the present invention, even a pulsed axial force caused by the rotor does not cause any deleterious axial movements at the bearing point on the input side of the transmission.

According to a further embodiment improving on the present invention, the rotor shaft is connected to the transmission via a flange on the input side of the transmission, wherein the flange connection is, for example, a bolt-stud connection. This frictional and positive engagement ensures easy assembly and disassembly of the rotor shaft on the transmission.

According to another embodiment improving on the invention, it is provided that the gear on the input side of the double-cardan coupling unit is fixed to the back of the flange on the input side of the transmission via a bolt connection, so that the second rotor shaft bearing arranged on the flange can be assembled from the direction of the small diameter of the flange present on the side of the transmission inner side. Due to the possibility of assembling the moment bearing from the direction of the transmission inner side, the latter need not be slid over the flange connection relatively larger in diameter, so that the moment bearing according to the present invention can have a relatively small structural size. Also, due to the bolt connection between the gear on the input side and the flange, an adjustment of the bearing backlash can be made in a simple manner. This is why the moment bearing arranged on the flange is limited on one side by a shoulder of the flange in the assembled state; on the opposite side, the moment bearing is defined by the abutment of the gear on the input side or another transmission element.

BRIEF DESCRIPTION OF THE DRAWINGS

Further measures improving on the present invention will be illustrated in conjunction with the description of a preferred exemplary embodiment of the present invention in more detail. In the drawing figures.

DETAILED DESCRIPTION OF THE INVENTION

Figure 1:
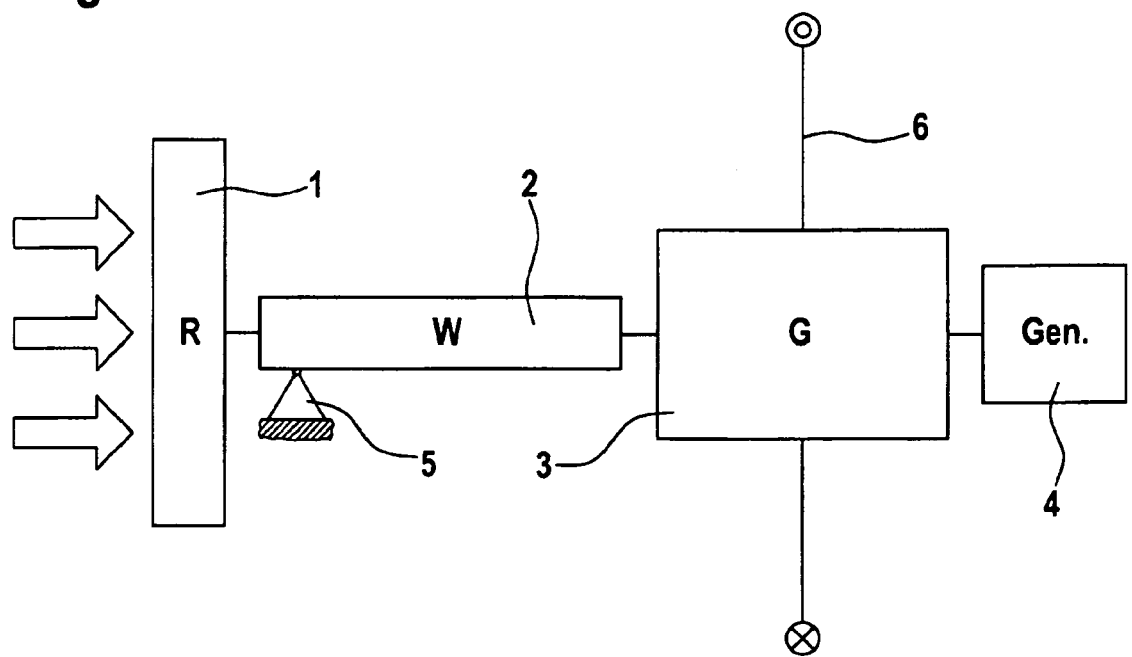
FIG. 1 is a schematic view of a drive train of a wind turbine generator system.

With reference to FIG. 1, the drive train of a wind turbine generator system comprises a rotor 1, which is rotated by a wind flow and therefore generates a torque which is transmitted to a transmission 3 via a rotor shaft 2 for transforming the rotor speed. Transmission 3 which, in the present exemplary embodiment, is at least partially formed as a planetary transmission, transforms the slow input speed into a higher speed for driving a downstream generator 4 for generating electric current.

In the drive train, a three-point support of rotor shaft 2 is present. Rotor shaft 2 is thus supported in the area of rotor 1 by a first rotor shaft bearing 5, which is formed as a fixed bearing. The support of the rotor shaft at the opposite end is located—as will be described in more detail below—within transmission 3, wherein its torque support 6 receives the rotor forces, moments and weight forces passed on by the transmission housing.

Figure 2:
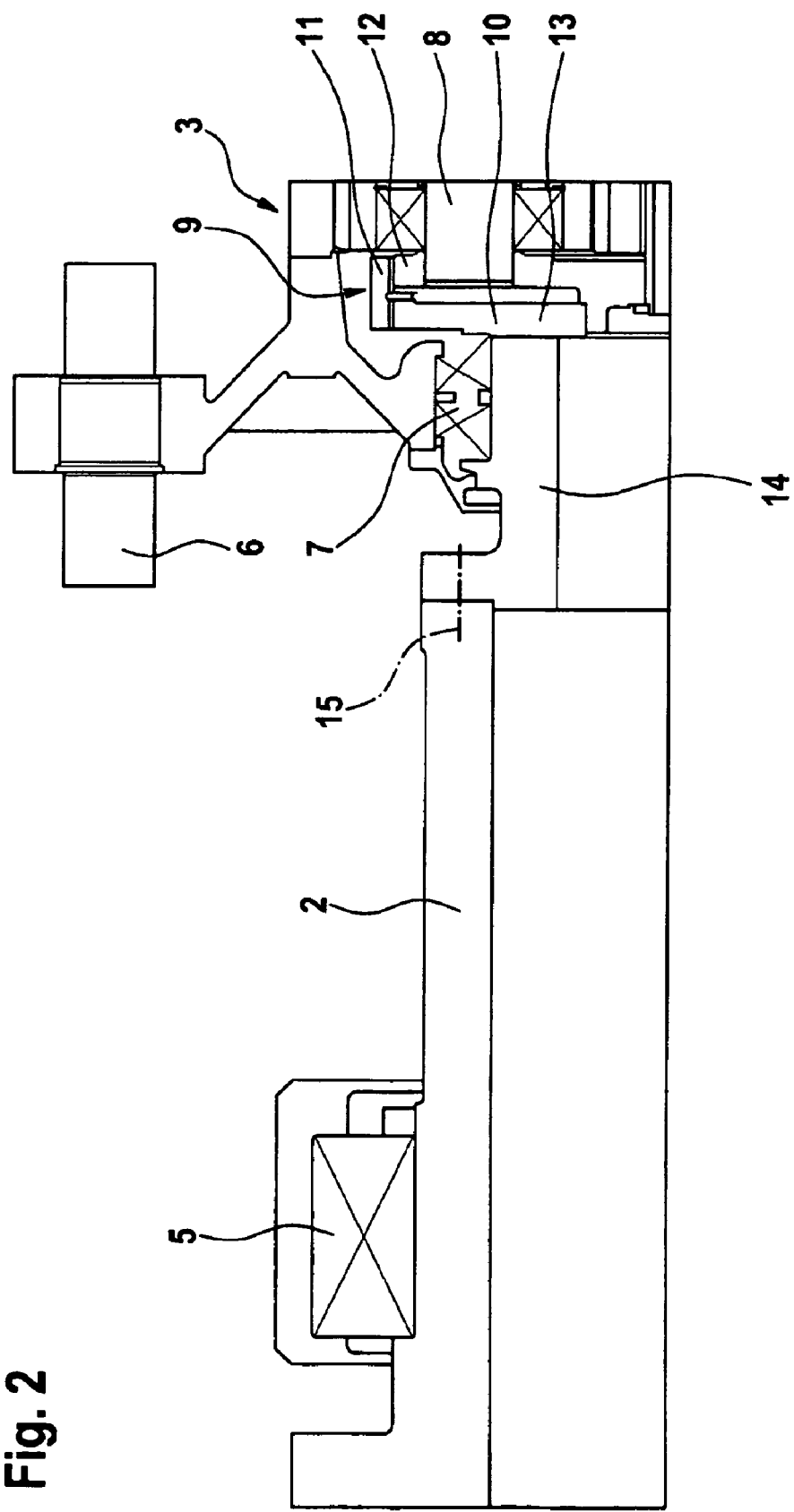
FIG. 2 is a partial sectional view of essential components of the drive train in a structural embodiment.

With reference to FIG. 2, rotor shaft 2 is supported on the side of transmission 3 by a second rotor shaft bearing 7 formed in the manner of a moment bearing. To be able to take over the function of a moment bearing, second rotor shaft bearing 7 is structured as a mutually angled, tapered roller bearing pair.

Downstream, as seen in the direction of the force flow, of second rotor shaft bearing 7, for elastic decoupling of downstream transmission element 8, there is a double-cardan coupling unit 9 which consists of a gear 10 on the input side having dome-shaped external toothing in the width and elevation dimension, which is in mesh with an overlapping toothed sleeve 11 having corresponding internal toothing. Toothed sleeve 11, due to its axial extension, defines the cardan effect of this double-cardan coupling unit 9. In accordance with this and axially spaced to gear 10 on the input side, a gear 12 is provided on the output side, also having dome-shaped toothing in the width and elevation dimension. Gear 12 on the output side cooperates with the downstream transmission element 8, which is a planet carrier of a downstream planet stage (not completely shown).

Gear 10 on the input side of double-cardan coupling unit 9 is fixed to a flange 14 on the input side of the transmission by means of a bolt and stud connection 13. Bolt and stud connection 13 also allows second rotor shaft bearing 7 arranged on flange 14 to be mounted on flange 14 from the inside of the transmission, i.e., from the side of the smaller diameter so that rotor shaft bearing 7 can be designed with a small diameter, because flange 14 is releasably connected to rotor shaft 2, e.g., via a bolt-stud connection 15 on the outside of the transmission. To be able to design the bolt-stud connection 15 in this position, the flange 14 must have a larger diameter.

Figure 3:
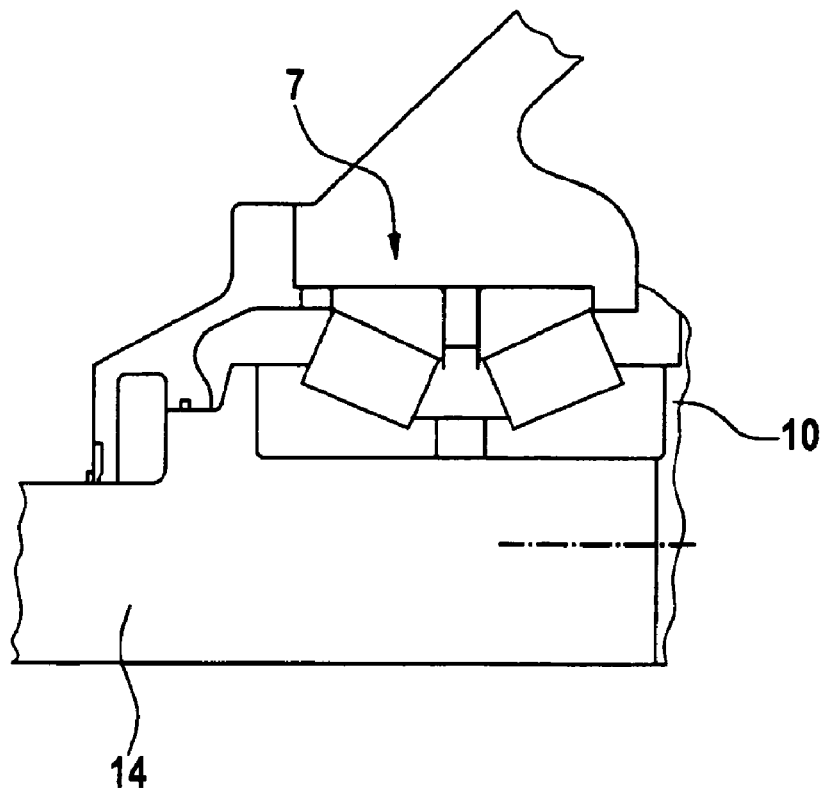
FIG. 3 is a schematic view of a first embodiment of the moment bearing.
Figure 4:
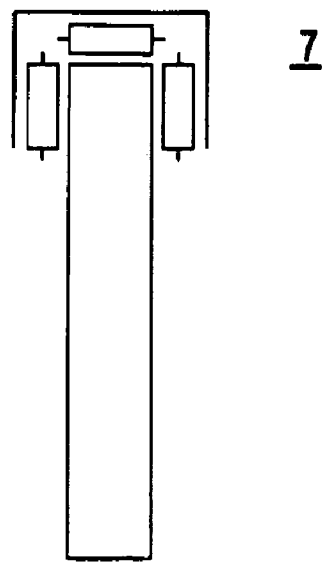
FIG. 4 is a schematic view of a second embodiment of the moment bearing.

With reference to FIG. 3, second rotor shaft bearing 7 constructed as a moment bearing can be designed as a mutually angled, tapered roller bearing pair according to a first embodiment. Alternatively, according to FIG. 4, second rotor shaft bearing 7 can also be constructed as a triple cylinder roller bearing, so that the function of a moment bearing is also achieved.

The present invention is not limited to the above-described preferred exemplary embodiment. For example, the means for elastic decoupling between second rotor shaft bearing 7 and transmission element 8 on the input side, instead of the double-cardan coupling unit 9, can be a flexible elastic membrane which has its central area connected with rotor shaft 2, whereas the flexible elastic membrane has its periphery connected with downstream transmission element 8 of transmission 3.

The invention claimed is:

1. A drive train between a rotor and a transmission having a torque support for a wind turbine generator system, comprising a rotor shaft extending from the rotor and supported in this area by a first rotor shaft bearing and extending to the transmission for converting the rotor speed into a desired generator speed,
   wherein said rotor shaft is supported by a second rotor shaft bearing formed in the manner of a moment bearing which is arranged on the input side within the transmission in order to receive the partial rotor forces, moments and weight forces and to pass them on to the torque support.

2. The drive train according to claim 1,
   wherein means for elastic decoupling of a downstream transmission element of the transmission are arranged downstream of the second rotor shaft bearing as seen in the direction of the force flow.

3. The drive train according to claim 2,
   wherein as a means for elastic decoupling a double-cardan coupling unit is provided.

4. The drive train according to claim 3,
   wherein said double-cardan coupling unit is comprised of a gear on the input side having external toothing dome-shaped in the width and elevation dimension which is in mesh with an overlapping toothed sleeve having a corresponding internal toothing which is in mesh with a gear on the output side arranged axially spaced with respect to the gear on the input side and also having external toothing dome-shaped in the width and elevation dimension.

5. The drive train according to claim 2,
   wherein, as a means for elastic decoupling, a flexible elastic membrane is provided which has its center connected to the rotor shaft and its periphery connected to the downstream transmission element of the transmission.

6. The drive train according to claim 3, wherein the gear on the input side of the double-cardan coupling unit is fixed on the separate flange on the transmission input side by means of a bolt and stud connection, so that the second rotor shaft bearing arranged on the flange can be mounted from the side of the smaller diameter of the flange present on the inside of the transmission.

7. The drive train according to claim 6, wherein the bearing backlash of the second rotor shaft bearing is adjustable by the bolt connection.

8. The drive train according to claim 1,
   wherein the moment bearing is designed in the manner of a mutually angled, tapered roller bearing pair or in the manner of a triple cylinder roller bearing.

9. The drive train according to claim 1,
   wherein a downstream transmission element of the transmission is part of a planet transmission stage on the input side.

10. The drive train according to claim 1, wherein the first rotor shaft bearing is formed as a loose bearing.

11. The drive train according to claim 10, wherein said loose bearing is constructed in the manner of a spherical roller bearing.

12. The drive train according to claim 1, wherein said rotor shaft is connected with the transmission via a flange on the input side of the transmission, wherein the flange connection is formed as a bolt-stud connection.

* * * * *